(No Model.)
H. G. LEE.
METHOD OF BLANCHING CELERY.
No. 357,610. Patented Feb. 15, 1887.
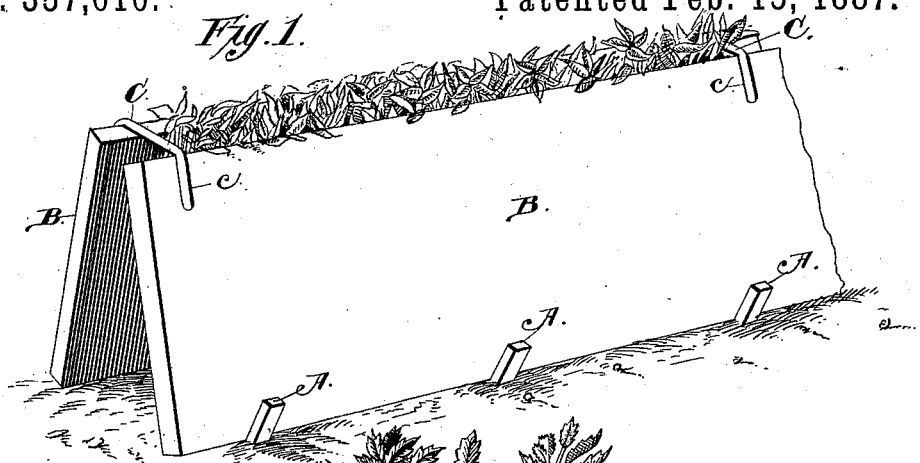
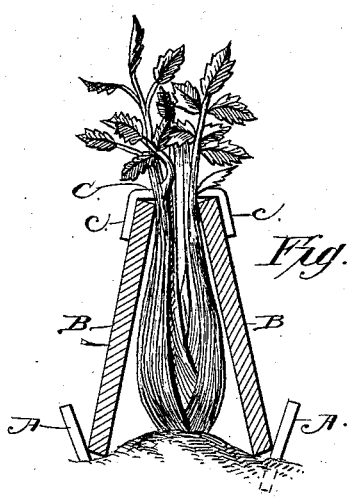

UNITED STATES PATENT OFFICE.

HORACE G. LEE, OF WHITING, KANSAS.

METHOD OF BLANCHING CELERY.

SPECIFICATION forming part of Letters Patent No. 357,610, dated February 15, 1887.

Application filed January 19, 1886. Serial No. 189,083. (No model.)

*To all whom it may concern:*

Be it known that I, HORACE G. LEE, a citizen of the United States, residing at Whiting, in the county of Jackson and State of Kansas, have invented a new and useful Improvement in Methods of Blanching Celery, of which the following is a specification, reference being had to the accompanying drawings.

My invention relates to an improvement in the method of blanching celery, consisting in allowing the plants to grow naturally, without hilling, until they attain a proper height, and then pressing the stalks together by inclined boards on opposite sides of the plants, and securing the upper edges of the boards together and against the upper ends of the celery-stalks, thereby excluding light from the plants, as will be more fully set forth hereinafter.

In the drawings, Figure 1 is a perspective view of devices I use in carrying out my invention. Figs. 2 and 3 are end elevations of said devices illustrating the method of applying the same to the celery-plants.

Heretofore it has been the common practice to blanch celery by hilling it up with earth, either while the plants are growing or after they have attained their growth. This process is very laborious and expensive, and is objectionable for the reason that the earth if damp or wet is apt to rust the celery. The process of hilling up the celery while the plants are growing also retards their growth.

The celery to be blanched by my improved method is planted in rows a suitable distance apart and allowed to attain a proper height, usually nearly or quite full growth. This causes the stalks to straggle or diverge upwardly from each other, the plants being thus larger at their tops than at the ground, as shown in Fig. 2. Boards B are then placed on edge at a suitable distance from the plants, and on both sides of each row of celery, and stakes A are driven into the ground on the outer sides of the boards to keep their lower edges from moving laterally from each other. The boards then have their upper edges pressed and inclined toward each other until their upper edges nearly meet, thus pressing the diverging stalks of the celery-plants together and forming them into compact bunches. The upper edges of the boards are then secured against the celery-stalks by means of bent wire staples or keepers C, that have depending diverging arms c, which bear on the outer upper edges of the boards, as shown in Figs. 1 and 3. The boards thus exclude light from the stalks, thereby blanching them. The tops of the celery-plants above the top edges of the boards remain exposed to the sunlight, and thus continue green and vigorous and enable the plants to continue to grow until frost. Celery thus blanched is of a very superior quality, and is ready for the market from two to four weeks earlier than that grown and blanched in the ordinary way. The boards used may be either twelve or fourteen inches in width, and may be placed over the celery before it has attained its full growth, if preferred.

Having thus described my invention, I claim—

The method of growing and blanching celery, consisting in allowing the plants to grow naturally, without hilling, until they attain a proper height, and then pressing the stalks together by inclined boards on opposite sides of the plants and securing the upper edges of the boards together and against the upper ends of the celery-stalks, substantially as described.

In testimony that I claim the foregoing as my own I have hereto affixed my signature in presence of two witnesses.

HORACE G. LEE.

Witnesses:
J. W. CROSSWHITE,
H. KAMPMEIER.